US012532119B2

(12) United States Patent
Ito

(10) Patent No.: US 12,532,119 B2
(45) Date of Patent: Jan. 20, 2026

(54) SPEAKER AND ACOUSTIC DEVICE USING SPEAKER

(71) Applicant: Alps Alpine Co., Ltd., Tokyo (JP)

(72) Inventor: Ryo Ito, Fukushima (JP)

(73) Assignee: ALPS ALPINE CO., LTD., Tokyo (JP)

( * ) Notice: Subject to any disclaimer, the term of this patent is extended or adjusted under 35 U.S.C. 154(b) by 199 days.

(21) Appl. No.: 18/455,839

(22) Filed: Aug. 25, 2023

(65) Prior Publication Data

US 2024/0080622 A1 Mar. 7, 2024

(30) Foreign Application Priority Data

Sep. 2, 2022 (JP) ................................ 2022-139919

(51) Int. Cl.
*H04R 7/18* (2006.01)
*H04R 9/02* (2006.01)
*H04R 9/06* (2006.01)

(52) U.S. Cl.
CPC ............... *H04R 7/18* (2013.01); *H04R 9/025* (2013.01); *H04R 9/06* (2013.01); *H04R 2400/11* (2013.01)

(58) Field of Classification Search
CPC . H04R 7/18; H04R 9/025; H04R 9/06; H04R 2400/11; H04R 7/12; H04R 9/02
See application file for complete search history.

(56) References Cited

U.S. PATENT DOCUMENTS

2002/0114484 A1* 8/2002 Crisco .................. H04R 1/2842
381/345

FOREIGN PATENT DOCUMENTS

| | | | |
|---|---|---|---|
| CN | 107 809 711 | A | 3/2018 |
| CN | 110 620 974 | A | 12/2019 |
| JP | 2021-034864 | A | 3/2021 |
| WO | WO 2006/035413 | A1 | 4/2006 |
| WO | WO 2021/056898 | A1 | 4/2021 |

OTHER PUBLICATIONS

Extended European Search Report from EP 23193511.5, 1-8 pp., Feb. 1, 2024.

* cited by examiner

*Primary Examiner* — Matthew A Eason
(74) *Attorney, Agent, or Firm* — Crowell & Moring LLP

(57) ABSTRACT

In a frame, a diaphragm and an edge member are provided on a first side, and a magnetic driving portion having a magnetic circuit and a voice coil is provided on the second side. An edge support member is interposed between the edge accepting portion of the frame and the outer circumference fixing portion of the edge member. Part of the edge support member is a restricting portion extending toward the center of the frame. The restricting surface of the restricting portion faces the back of the edge member and diaphragm so as to be spaced with a distance.

10 Claims, 5 Drawing Sheets

SPEAKER AND ACOUSTIC DEVICE USING SPEAKER

RELATED APPLICATION

The present application claims priority to Japanese Patent Application No. 2022-139919, filed Sep. 2, 2022, the entirety of which is herein incorporated by reference.

BACKGROUND

1. Field

The present disclosure relates to a speaker that can restrict excessive motion of a diaphragm, and to an acoustic device that uses the speaker.

2. Description of the Related Art

A speaker used in an acoustic device has a diaphragm in a cone shape and a magnetic driving portion. When the diaphragm is caused to vibrate by the magnetic driving portion, sound pressure is generated. When, in this type of speaker, an unanticipated change in pressure in the speaker occurs, or the magnetic driving portion performs an excessive operation, for example, the diaphragm and an edge member that supports the outer circumferential portion of the diaphragm may greatly move unexpectedly, and the shape of the edge member may be inverted. This may prevent the diaphragm and edge member from being restored. JP2021-34864 A describes a vehicle-mounted acoustic device intended to address this type of problem.

With the acoustic device described in JP2021-34864 A, a speaker unit is fixed in a case. An internal space in the case is divided into two spaces along a diaphragm, which forms a boundary. One of the spaces is an external space open to the atmosphere, and the other space is an internal space that is substantially closed. In the speaker unit, a vibrator restricting portion is provided between an edge member that supports the diaphragm and a damper that supports a bobbin. The vibrator restricting portion faces the diaphragm and edge member. This acoustic device prevents such a problem that when pressure in the internal space is lowered, for example, because the acoustic device has been placed in an environment at high temperatures and then comes into contact with cold water, and the diaphragm and edge member thereby tend to greatly deform toward the internal space, at which time, if the edge member and diaphragm strike the vibrator restricting portion, the amount of motion of the diaphragm is restricted, and the shape of the edge member is inverted, which prevents the edge member and diaphragm from being restored.

With the acoustic device described in JP2021-34864 A, the outer circumferential portion of the damper that supports the bobbin, on which a coil is wound, so that the bobbin can vibrate, is fixed in a bracket with an adhesive. Additionally, a restricting portion forming member, which forms the vibrator restricting portion, is fixed on the outer circumferential portion of the damper with an adhesive. Therefore, a state in which the restricting portion forming member is fixed is nonuniform, so the position of the vibrator restricting portion is likely to vary among products. If an attempt is made to position the restricting portion forming member highly precisely in this structure, assembling work becomes extremely complex.

Another problem is that when the diaphragm and edge member move toward a magnetic circuit, the vibrator restricting portion restricts the flow of air. This increases resistance to the operation of the diaphragm and drops acoustic quality.

The present disclosure addresses the above problems with an object of providing a speaker that can restrict excessive operation of a diaphragm, and in which a restricting portion can be highly precisely positioned with simple assembling work.

SUMMARY

A speaker according to the present disclosure has a frame, a diaphragm, an edge member disposed between the frame and the outer circumferential portion of the diaphragm, and a magnetic driving portion that causes the diaphragm to vibrate, the diaphragm being positioned on a first side, the magnetic driving portion being positioned on a second side.

An edge support member is interposed and fixed between an edge accepting portion, formed as part of the frame, and the outer circumference fixing portion of the edge member. A restricting portion extending inward beyond the edge accepting portion is formed as part of the edge support member.

The restricting portion is positioned more on the second side than the edge member, and faces the edge member with a gap between the restricting portion and the edge member.

With the speaker of the present disclosure, a vent extending from the first side to the second side is preferably formed in the restricting portion.

For example, the speaker of the present disclosure can be structured so that a groove open toward the center of the frame is formed in the restricting portion as the vent, and so that a plurality of grooves are circumferentially formed at intervals.

With the speaker of the present disclosure, an opposing wall facing the outer circumferential end face of the edge support member is preferably provided as part of the frame.

With an acoustic device in which the speaker of the present disclosure is used, the frame is fixed in a case, for example.

The interior of the case is divided into an external ventilation space more on the first side than the diaphragm, and a closed space more on the second side than the diaphragm.

In the present disclosure, when the diaphragm of the speaker greatly moves toward the second side, the edge member and diaphragm abut the restricting portion. Therefore, it is possible to restrain the edge member from being excessively deformed to the extent that the shape of the edge member is inverted. In assembling work, the edge support member is bonded to the outer circumference fixing portion of the edge member in advance, so it is possible to prevent the edge member from being deformed at a time of storage or during assembling work. Special bonding work to assemble the edge support member to the frame is not needed. The edge support member provides a function for preventing the edge member from being deformed during assembling work, a function for restricting an amount by which the edge member moves in the second direction, and a function used as a gasket that seals a bonded portion between the edge member and the frame. This can reduce the number of parts constituting the speaker.

DESCRIPTION OF THE PREFERRED EMBODIMENTS

Figure 5:
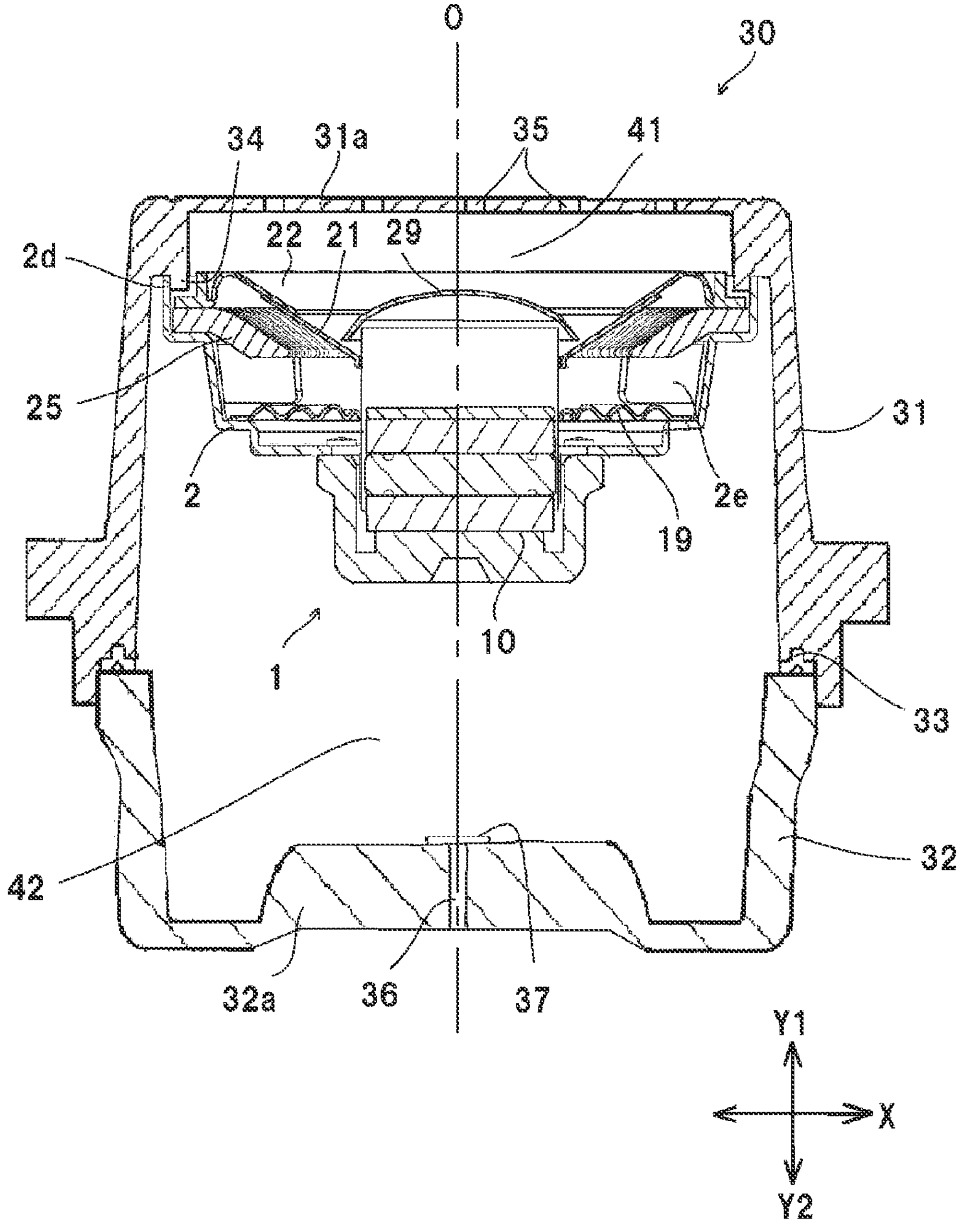
FIG. 5 is a sectional view illustrating a vehicle-mounted acoustic device in which the speaker in FIG. 1 is accommodated in a case.

In the drawings illustrating a speaker 1 in an embodiment of the present disclosure, the Y1 direction is the forward direction and the Y2 direction is the backward direction. The Y1-direction side is a first side and the Y2-direction side is a second side. The X direction is the radial direction or diametrical direction. With the speaker 1, either the Y1 direction or the Y2 direction is a sound generation direction. When the speaker 1 is accommodated in a case, and is used as a vehicle-mounted acoustic device, as illustrated in FIG. 5, the Y1 direction is the sound generation direction. The main portion of the speaker 1 in the embodiment has a true circular shape centered around a center line O in plan view, when the main portion is viewed from the front side, as illustrated in the exploded perspective view in FIG. 3. However, the shape in plan view may be elliptical or oblong.

The speaker 1 has a frame 2. The frame 2 is formed from a non-magnetic material or a magnetic material. The frame 2 is cylindrical and its shape in plan view is true circular, as illustrated in FIG. 3. In the speaker 1, a diaphragm 21 and an edge member 22 are supported on the first side (Y1-direction side) of the frame 2, and a magnetic circuit 10 forming a magnetic driving portion is fixed on the second side, as illustrated in FIGS. 1 and 2.

The magnetic circuit 10 has a magnet 11 in a discoidal or disk shape, a front yoke 12 attached to the front of the magnet 11, and a rear yoke 13 attached to the rear of the magnet 11. The front yoke 12 and rear yoke 13 are formed from an iron-based magnetic metal material. The rear yoke 13 has an external yoke portion 13*a* extending forward from the outer circumferential portion, the external yoke portion 13*a* being integrally formed as part of the rear yoke 13. A magnetic gap G in a cylindrical shape is formed between the outer circumferential surface of the front yoke 12 and the inner circumferential surface of the external yoke portion 13*a*. With the magnetic circuit 10, extension members 14 and 15 are attached to the front of the front yoke 12 so as to be overlaid on each other.

Figure 1:
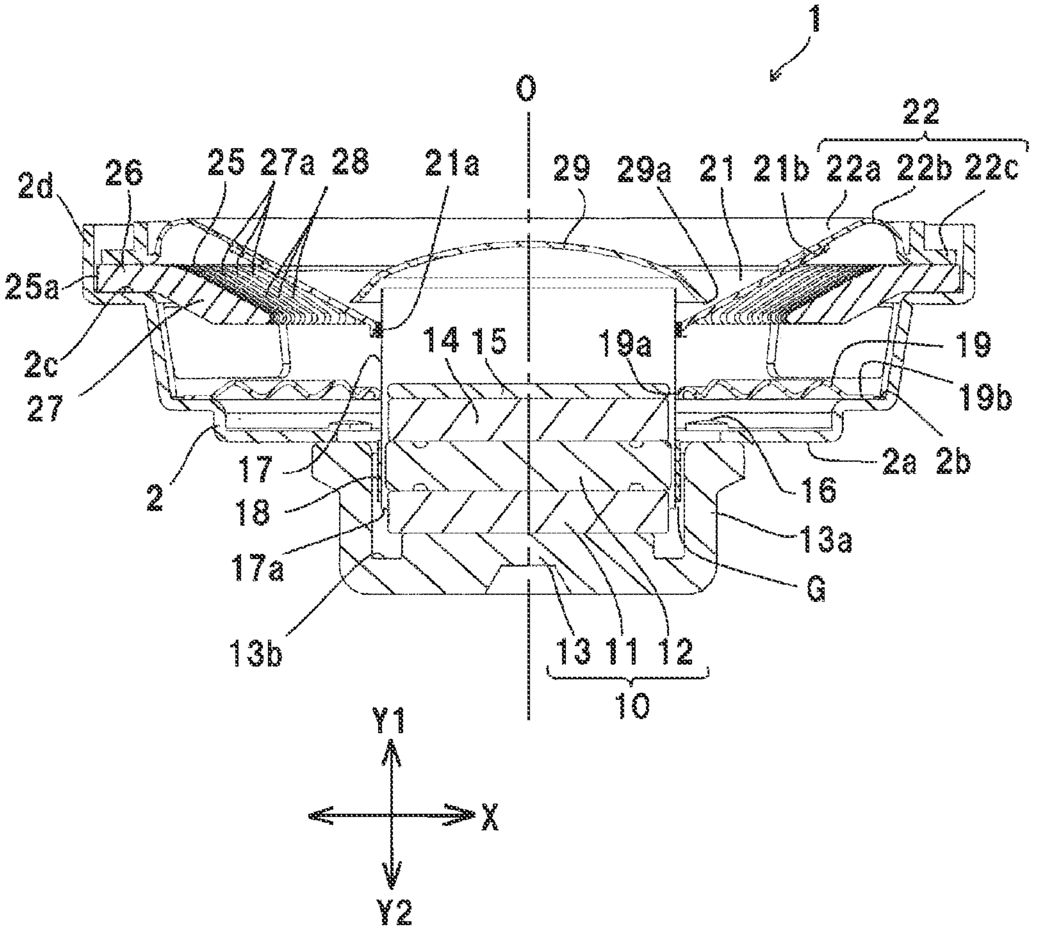
FIG. 1 is a sectional view of a speaker in an embodiment of the present disclosure.
Figure 2:
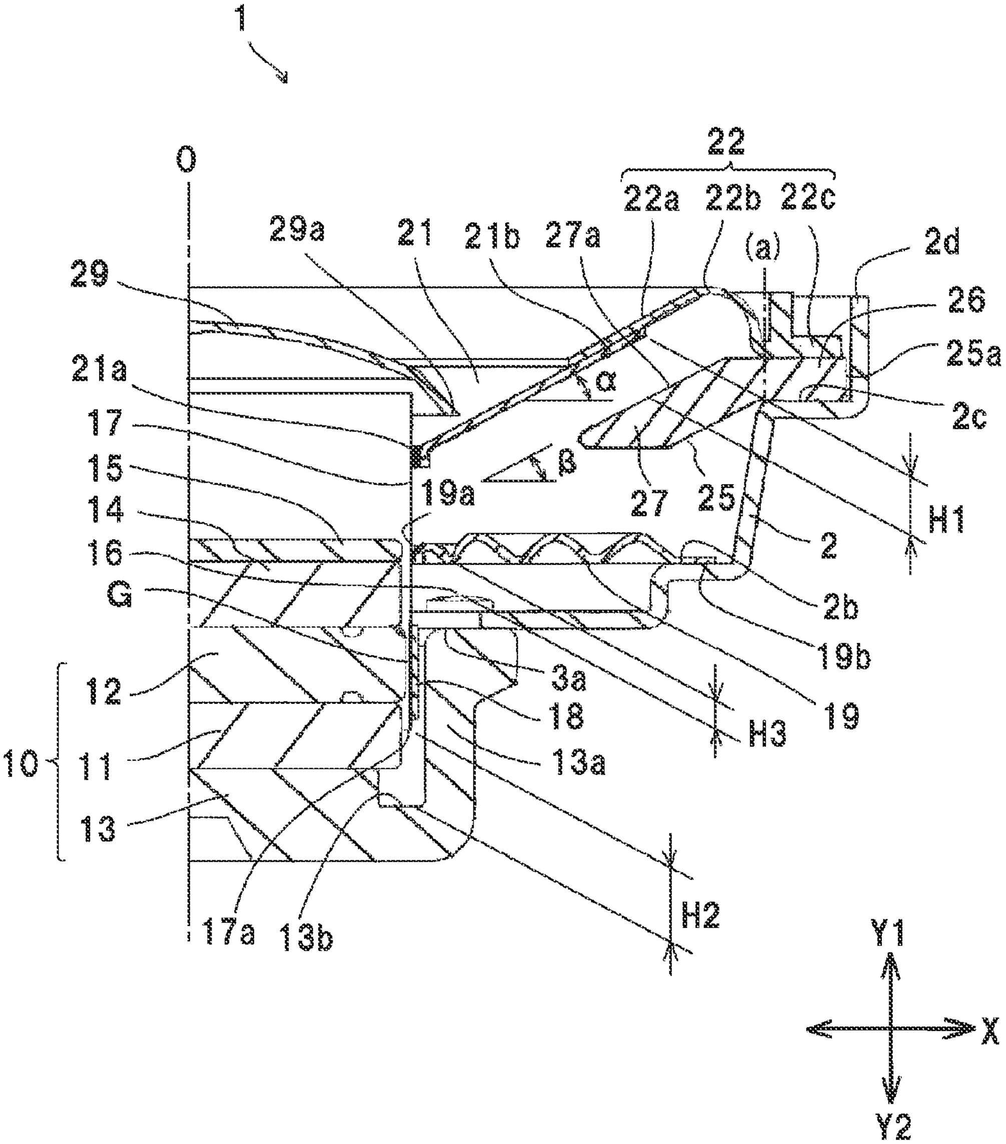
FIG. 2 is a partially enlarged view illustrating a half of the sectional view of the speaker in FIG. 1.
Figure 3:
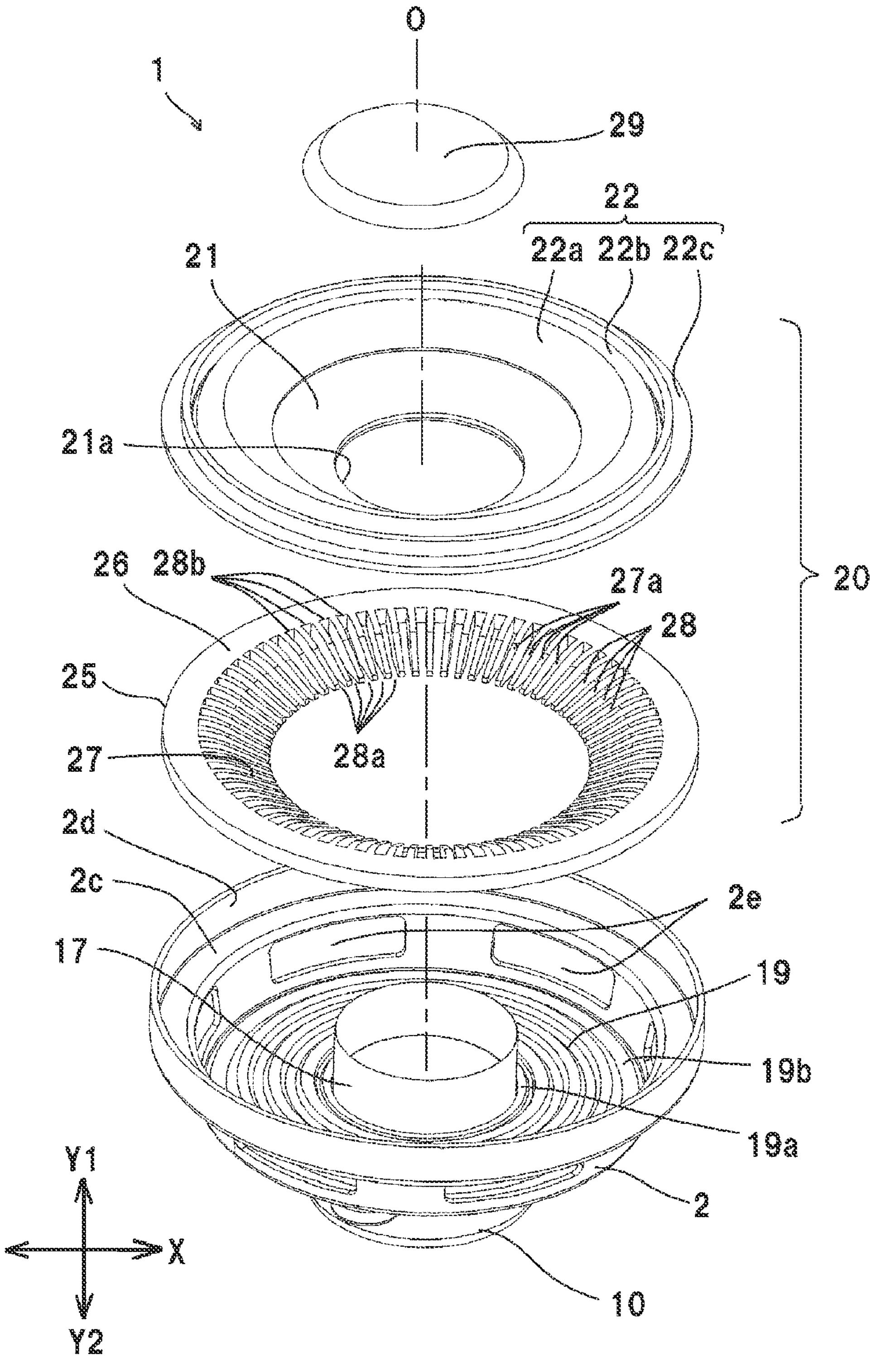
FIG. 3 is an exploded perspective view of the speaker in FIG. 1.

A bottom plate 2*a* perpendicular to the center line O is formed on the rear side of the frame 2, as illustrated in FIGS. 1 and 2. The magnetic circuit 10 is fixed to the rear surface of the bottom plate 2*a* by using circuit fixing portions 16. The circuit fixing portion 16 is a fixing protrusion that protrudes forward from the front surface of the external yoke portion 13*a* of the rear yoke 13. To fix the magnetic circuit 10, this fixing protrusion is press-fitted into a fixing hole formed in the bottom plate 2*a* or is crimped. The circuit fixing portion 16 may be a fixing screw with which the external yoke portion 13*a* is fixed to the bottom plate 2*a*.

A bobbin 17 is supported in the frame 2 so as to be movable in the front-back direction (Y1-Y2 direction). The bobbin 17 is cylindrical in shape. A voice coil 18 is wound around the outer circumferential portion at the end of the bobbin 17 in the backward direction (Y2 direction). The voice coil 18 is positioned in the magnetic gap Gin the magnetic circuit 10. A magnetic flux, which is generated from the magnet 11 in the magnetic circuit 10 and traverses the magnetic gap G, and a voice coil current flowing in the voice coil 18, generate a driving force with which the bobbin 17 is caused to vibrate in the front-back direction. The magnetic circuit 10 and voice coil 18 form a magnetic driving portion.

A damper 19 is provided around the outer circumferential portion of the bobbin 17, as illustrated in FIGS. 1 and 2. The damper 19 is formed from a sheet material having an elastic restoring force such as, for example, a paper material or a resin-impregnated paper material. The damper 19 is discoidal or disk shaped, as illustrated in FIG. 3. The cross section of the damper 19 has a corrugated shape, as illustrated in FIGS. 1 and 2. The inner circumferential portion 19*a* of the damper 19 is bonded to the outer circumferential surface of the bobbin 17. The outer circumferential portion 19*b* of the damper 19 is bonded to a damper fixing portion 2*b* formed as part of the frame 2. The bobbin 17 is supported by the damper 19 so that bobbin 17 can vibrate in the front-back direction. When an external force is not exerted on the bobbin 17, the elastic restoring force of the damper 19 can be used to support the bobbin 17 at a neutral position in the font-back direction.

The diaphragm 21 is formed from, for example, a paper material or a resin-impregnated paper material so as to have a cone shape. The shape of the cross section of the diaphragm 21 is inclined downward (toward the second side) toward the center line O, as illustrated in FIGS. 1 and 2. A center hole 21*a* in the diaphragm 21 has a true circular shape, the diameter of which is slightly larger than the outer diameter of the bobbin 17. The edge member 22 is formed from, for example, a rubber material, a urethane material, or a rubber-impregnated cloth material. The edge member 22 has a tapered portion 22*a* close to the center, a deformed portion 22*b* close to the outer circumferential, and an outer circumference fixing portion 22*c* closer to the outer circumferential than the deformed portion 22*b*. The tapered portion 22*a* is inclined at an angle almost equal to the angle at which the diaphragm 21 is inclined, as illustrated in the sectional views in FIGS. 1 and 2. The tapered portion 22*a* is fixed to the front surface of the outer circumferential portion 21*b* of the diaphragm 21 by being bonded. The deformed portion 22*b* is curved so as to protrude forward. The deformed portion 22*b* has a lower flexural rigidity than the diaphragm 21. Due to deformation of the deformed portion 22*b*, therefore, the diaphragm 21 can be caused to vibrate in the front-back direction. The deformed portion 22*b* has a slight elastic restoring force. When an external force is not exerted on the diaphragm 21, the deformed portion 22*b* functions together with the damper 19 so as to support the diaphragm 21 at the neutral position in the font-back direction. The outer circumference fixing portion 22*c* of the edge member 22 has a ring shape centered around the center line O. The outer circumference fixing portion 22*c* has a certain thickness in the radial direction (X direction).

An edge accepting portion 2*c* is formed at the front of the frame 2, as illustrated in FIGS. 1 and 2. The edge accepting portion 2*c* is a ring-shaped region. The front surface (accepting surface) oriented forward (in the Y1 direction) is a flat surface perpendicular to the center line O. An opposing wall 2*d* is provided as part of the frame 2, the opposing wall 2*d* extending further forward from the outer circumference of the edge accepting portion 2*c*. The opposing wall 2*d* has a cylindrical shape centered around the center line O. A plurality of openings 2*e* are formed in an outer circumferential surface of the frame 2, the outer circumferential surface being more on the rear side (Y2-direction side) than the edge accepting portion 2c, as illustrated in FIG. 3. A space defined by the diaphragm 21, edge member 22, and damper 19 communicates with a space outside the frame 2 through the openings 2e.

An edge support member 25 is fixed to the edge accepting portion 2c of the frame 2 by being bonded, and the outer circumference fixing portion 22c of the edge member 22 is fixed to the front of the edge support member 25 by being bonded, as illustrated in FIGS. 1 and 2. The edge support member 25 has an edge member support function for preventing the edge member 22 from being deformed during assembling work, a function used as a gasket that assures airtightness at a bonded portion between the edge accepting portion 2c and the edge member 22, and a vibration restriction function for restricting backward movement of the edge member 22 and diaphragm 21 when they are incorporated into the frame 2.

The edge support member 25 has an intervening portion 26 in a ring shape at the outermost circumference, and also a restricting portion 27 extending inward beyond the intervening portion 26 in the frame 2, as illustrated in FIG. 3. The front surface, oriented forward (in the Y1 direction), of the restricting portion 27 is the restricting surface 27a, as illustrated in FIG. 2. The restricting surface 27a is a tapered surface inclined downward (in the Y2 direction) toward the center line O. The restricting portion 27 has a comb shape having many vents 28, as illustrated in FIG. 3. Each vent 28 is a groove. An open end 28a of the vent 28 is open toward the center line O. An outer circumference inner-end 28b of the vent 28 is positioned at a boundary between the intervening portion 26 and the restricting portion 27. Grooves, each of which is the vent 28, are circumferentially arranged at a constant pitch. A tooth of the comb is formed between each two adjacent vents 28. In the restricting portion 27 of the edge support member 25, each vent 28 extends from the first side (Y1-direction side) to the second side (Y2-direction side). Since the restricting portion 27 is comb-shaped, the total opening area ratio of the vents 28 can be increased. The vent 28 is not limited to a groove of a comb shape. Vents 28 may be formed by forming many circular or rectangular through-holes in the restricting portion 27.

When assembling the speaker 1, the magnetic circuit 10 is fixed to the bottom plate 2a of the frame 2 by using the circuit fixing portions 16. The bobbin 17, around which the voice coil 18 is wound, is inserted into the frame 2 from the front side in a state in which the bobbin 17 is fitted into a cylindrical tool so that the voice coil 18 is positioned in the magnetic gap G. In a state in which the voice coil 18 is positioned in the magnetic gap G, the damper 19 is assembled to the outer circumference of the bobbin 17 positioned by the cylindrical tool. The inner circumferential portion 19a of the damper 19 is bonded to the outer circumferential surface of the bobbin 17. Then, the outer circumferential portion 19b of the damper 19 is bonded to the damper fixing portion 2b of the frame 2.

Figure 4:
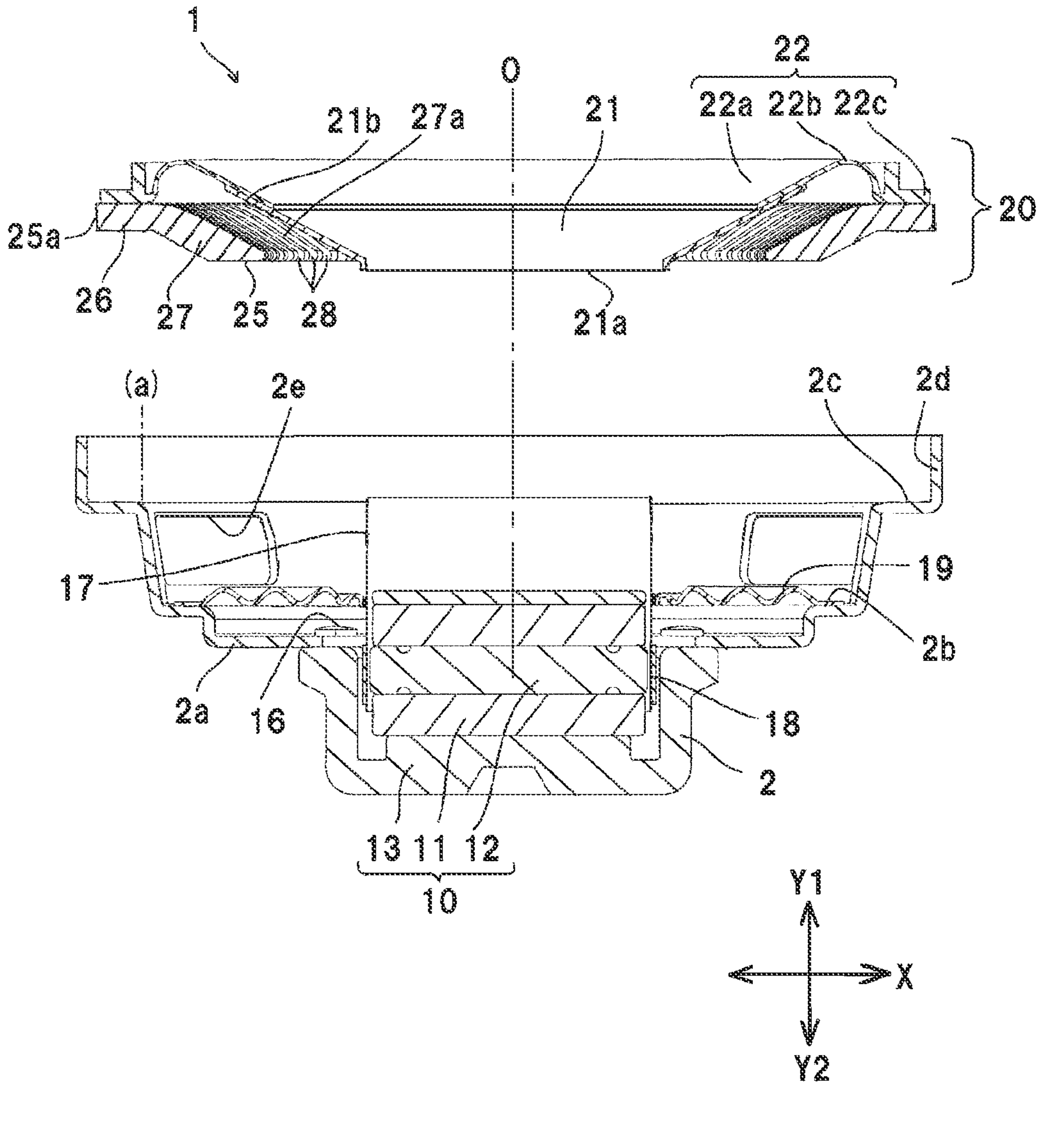
FIG. 4 is an exploded sectional view illustrating an example of work to assemble the speaker in FIG. 1.

Three members, diaphragm 21, edge member 22 and edge support member 25, are bonded together in advance to form a partial assembly 20, as illustrated in FIGS. 3 and 4. The diaphragm 21 and edge member 22 are mutually positioned by using a tool and are then bonded. The edge member 22 and edge support member 25 are also mutually positioned by using a tool, after which the outer circumference fixing portion 22c of the edge member 22 is fixed to the front surface of the intervening portion 26 of the edge support member 25 with an adhesive. When this partial assembly 20 is incorporated into the frame 2, as described later, the diaphragm 21, edge member 22, and edge support member 25 can be highly precisely positioned in the frame 2 to assemble them. When the outer circumference fixing portion 22c of the edge member 22 is handled at a time of storage, or during assembling work, the outer circumference fixing portion 22c is protected by being reinforced by the edge support member 25. Therefore, it becomes easy to prevent the edge member 22 from being deformed before the diaphragm 21 and edge member 22 are assembled to the frame 2.

When the partial assembly 20 is incorporated into the frame 2 from the front side, as illustrated in FIG. 4, in a state in which the bobbin 17 is positioned by the cylindrical tool so that the center hole 21a in the diaphragm 21 is fitted to the outer circumference of the bobbin 17, the center hole 21a in the diaphragm 21 is positioned on the outer circumferential surface of the bobbin 17. Therefore, the whole of the partial assembly 20 is highly precisely positioned in the frame 2. The opposing wall 2d, at the foremost portion of the frame 2, is formed so that the dimension of the inner diameter of the opposing wall 2d is slightly larger than the dimension of the outer diameter of the outer circumferential end face 25a of the edge support member 25. Therefore, when the partial assembly 20 is incorporated into the frame 2, the partial assembly 20 can be smoothly inserted with the outer circumferential end face 25a of the edge support member 25 facing the inner surface of the opposing wall 2d. With the partial assembly 20 positioned as described above, the inner circumferential end face of the center hole 21a in the diaphragm 21 is fixed to the outer circumferential surface of the bobbin 17 with an adhesive. Then, the intervening portion 26 of the edge support member 25 is bonded to the edge accepting portion 2c of the frame 2.

After the partial assembly 20 has been assembled to the inside of the frame 2, the cylindrical tool is removed and a cap member 29 is attached. Specifically, the bottom end 29a of the cap member 29 is fixed to the front surface of the diaphragm 21 with an adhesive. The cap member 29 is formed from a sheet material that can seal air. Upon completion of the assembling of the speaker 1 illustrated in FIGS. 1 and 2, the inner space in the bobbin 17 is covered by the cap member 29 from the front side. The interior of the frame 2 is divided into a space on the front side (Y1-direction side) and a space on the rear side (Y2-direction side) along the diaphragm 21, edge member 22, and cap member 29, which form a boundary.

After the speaker 1 has been assembled, the edge support member 25 extends toward the interior of the frame 2 beyond the end (a) of the edge accepting portion 2c of the frame 2 on the inner side, as illustrated in FIG. 2. This extending portion is the restricting portion 27. A restricting surface 27a, which is the front surface of the restricting portion 27, faces the edge member 22 and diaphragm 21 from the rear side (second side). An inclination angle $\alpha$ on a cross section of the diaphragm 21 and the tapered portion 22a of the edge member 22, and an inclination angle $\beta$ of the restricting surface 27a of the edge support member 25, are equal to or almost equal to each other. Here, the phrase "almost equal" means that the difference between the inclination angle $\alpha$ and the inclination angle $\beta$ is ±5 degrees or less, and preferably ±3 degrees or less.

In FIG. 2, the minimum value of the facing distance between the restricting surface 27a and the diaphragm 21 and edge member 22 in the front-back direction (Y1-Y2 direction) is indicated by H1; the minimum value of the facing distance between the backmost end 17a of the bobbin 17 and the inner bottom 13b of the rear yoke 13, which is part of the magnetic circuit 10, in the front-back direction, is indicated by H2; and, the minimum value of the facing distance between the damper 19 and the circuit fixing portion 16, which functions as a damper restricting portion, in the front-back direction, is indicated by H3. The minimum value H2 is preferably the greatest, followed by the minimum value H1, followed by the minimum value H3. Alternatively, the minimum value H1 is preferably the greatest, followed by the minimum value H2, followed by the minimum value H3.

Next, an example of the operation of the speaker 1 will be described.

FIG. 5 illustrates an acoustic device 30, intended to be mounted on a vehicle, in which the speaker 1 in the embodiment of the present disclosure is used. The acoustic device 30 is attached to the body of an automobile, and may generate a travel alarm sound toward the outside of the body. For example, the acoustic device 30 may be used in a severe environment in which the acoustic device 30 tends to undergo moisture, such as rain water.

With the acoustic device 30, a front case 31 and a rear case 32 are bonded with a packing 33 intervening between them. The speaker 1 is fixed in the front case 31 by a fixing support member (not illustrated). A speaker abutting portion 34 in a ring shape is formed at the front of the interior of the front case 31. The opposing wall 2*d* at the front of the frame 2 is attached to the outer circumference of the speaker abutting portion 34. The speaker abutting portion 34 and opposing wall 2*d* are bonded together so that a clearance is not formed between them. As a result, the interior of the front case 31 and rear case 32 is divided into a front space 41 and a rear space 42 by the diaphragm 21, edge member 22, and cap member 29.

Sound generation ports 35 are formed in the front wall 31*a* of the front case 31 so as to pass through the front wall 31*a*. The front space 41 is an external ventilation space communicating with the external space through the sound generation ports 35. A vent hole 36 is formed in the rear end wall 32*a* of the rear case 32 so as to pass through the rear end wall 32*a*. The vent hole 36 is covered with a closing film 37 from the inside. The closing film 37 is formed from a material that allows air to pass through the closing film 37 but does not transmit a liquid. As a result, the rear space 42 is a closed space, in which moisture coming from the outside does not come into direct contact with the magnetic driving portion, which includes the magnetic circuit 10, in the speaker 1.

When a current passes through the voice coil 18 in the speaker 1, a magnetic flux traversing the magnetic gap Gin the magnetic circuit 10, and a voice coil current flowing in the voice coil 18, generate a driving force exerted on the bobbin 17 in the front-back direction, by which the bobbin 17, diaphragm 21, and edge member 22 are caused to vibrate in the front-back direction. Sound pressure is given to the front space 41 due to this vibration is then transmitted to the outside space through the sound generation ports 35, generating a travel alarm sound toward the outside. Sound pressure having a phase opposite to the phase of sound pressure given to the front space 41 is given to the rear space 42 due to the vibration of the diaphragm 21 and edge member 22. Since the interior of the rear space 42 communicates with the outside of the rear case 32 through the vent hole 36, even when the density of air in the rear space 42 changes, it is possible to suppress an excessive damper effect, which would otherwise be caused by compressed air in the rear space 42.

In normal sound generation operation, a movable portion including the diaphragm 21, bobbin 17, and the like does not abut the internal surface of the frame 2. However, if a non-standard excessive current flows in the voice coil 18, for example, due to a malfunction of an acoustic circuit, the movable portion may be forcibly moved backward (in the Y2 direction) over a long distance. As described above, with reference to FIG. 2, the relation of the minimum values of the facing distances between the movable portion and the inner surfaces of the frame 2 is as follows: H2 is the greatest, followed by H1, followed by H3. Therefore, at a time when the movable portion moves backward by the minimum value H3, the damper 19 abuts the circuit fixing portions 16, which function as a damper restricting portion, so the diaphragm 21 and edge member 22 do not abut the restricting surface 27*a* of the edge support member 25 in such a way that an impact occurs, and the backmost end 17*a* of the bobbin 17 also does not abut the inner bottom 13*b* of the rear yoke 13 in such a way that an impact occurs. As a result, it is possible to prevent the diaphragm 21, edge member 22, and bobbin 17 from being deformed or damaged.

In an environmental test for the acoustic device 30, which has been assembled, before it is shipped, or in a state in which the acoustic device 30 is actually used, with the acoustic device 30 attached to the body of an automobile, temperature in the environment in which the acoustic device 30 is placed may greatly rise, after which the temperature of the case may rapidly drop, for example, due to water exposure. When this happens, an air flow in the vent hole 36 cannot follow a change in pressure, and pressure in the rear space 42 thereby rapidly drops. When pressure in the rear space 42 drops, the movable portion moves backward and the damper 19 abuts the circuit fixing portions 16, after which the diaphragm 21 and edge member 22 tend to be deformed by being further attracted backward. However, since the edge member 22 and diaphragm 21 abut the restricting surface 27*a* of the edge support member 25, it is possible to prevent the diaphragm 21 and edge member 22 from being excessively deformed.

As illustrated in FIG. 2, the diaphragm 21, the tapered portion 22*a* of the edge member 22, and the restricting surface 27*a* of the edge support member 25 are inclined in the same orientation; the inclination angle $\alpha$ and inclination angle $\beta$ are almost equal to each other; and, the diaphragm 21 and the tapered portion 22*a* and the restricting surface 27*a* face each other substantially in parallel. Therefore, when the diaphragm 21 and edge member 22 start to deform backward, they abut the restricting surface 27*a*, so the cone shape of the diaphragm 21 and the taper shape of the tapered portion 22*a* can be maintained. As a result, it is possible to prevent the deformed portion 22*b* of the edge member 22 from being excessively deformed; otherwise, the direction in which the deformed portion 22*b* protrudes would be inverted. When pressure in the rear space 42 is recovered, the shapes of the diaphragm 21 and edge member 22 can be restored.

With the speaker 1 in the embodiment, the restricting surface 27*a* faces the back of the diaphragm 21 and edge member 22 so as to be spaced by a distance of the minimum value H1. Therefore, when the diaphragm 21 and edge member 22 vibrate in the font-back direction in normal sound generation operation, the vibration property of the diaphragm 21 may be affected by a change in the pressure of air between the diaphragm 21 and edge member 22 and the restricting surface 27*a*. However, since many comb-shaped grooves are formed in the restricting portion 27 of the edge support member 25 as the vents 28, as illustrated in FIG. 3, a large amount of air can be moved between a space defined by the diaphragm 21, edge member 22, and restricting surface 27*a*, and a space behind the restricting portion 27. Therefore, when the diaphragm 21 and edge member 22 vibrate in the front-back direction, it is possible to restrain the space defined by the diaphragm 21, edge member 22, and restricting surface 27*a* from providing an excessive damper effect, preventing the vibration property of the diaphragm 21 from being adversely affected.

The edge support member 25 has an edge member support function that prevents the edge member 22 from being deformed during assembling work, a function used as a gasket that assures airtightness at a bonded portion between the edge accepting portion 2*c* and the edge member 22, and a vibration restriction function that restricts backward movement of the edge member 22 and diaphragm 21. In many conventional speakers as well, a gasket is interposed between the frame and the edge member. With the speaker 1 in the embodiment herein, however, the gasket also functions as the restricting portion 27. This prevents the number of parts from increasing. The diaphragm 21, edge member 22, and edge support member 25 are bonded together to form the partial assembly 20, as illustrated in FIGS. 3 and 4. The partial assembly 20 is incorporated into the frame 2. This simplifies work to incorporate the restricting portion 27, and enables the relative positions of the restricting portion 27, diaphragm 21, and edge member 22 to be highly precisely determined.

Specific embodiments and specific examples of the present disclosure have been described above with reference to the attached drawings. The specific embodiments and specific examples described above are only specific examples of the present disclosure, which are used to understand the present disclosure, rather than limit the scope of the present disclosure. Those skilled in the art can make various modifications, combinations and reasonable omissions of elements in specific embodiments and specific examples based on the technical ideas of the present disclosure, and the embodiments thus obtained are also included in the scope of the present disclosure. For example, the above-mentioned embodiments and specific examples may be combined with each other, and the combined embodiments are also included in the scope of the present disclosure. Therefore, it is intended that this disclosure not be limited to the particular embodiments disclosed, but that the invention will include all embodiments falling within the scope of the appended claims.

What is claimed is:

1. A speaker comprising:

a frame;

a diaphragm, an edge member disposed between the frame and an outer circumferential portion of the diaphragm, the edge member having a deformed portion close to a outer circumferential and a tapered position close to a center; and a magnetic driving portion including a bobbin that is able to vibrate in a front-back direction, for causing the diaphragm to vibrate, the diaphragm being positioned on a first side along the front-back direction, the magnetic driving portion being positioned on a second side along the front-back direction;

wherein an edge support member is interposed and fixed between an edge accepting portion formed as part of the frame and an outer circumference fixing portion of the edge member, and a restricting portion extending inward beyond the edge accepting portion is formed as part of the edge support member;

wherein the restricting portion is positioned more on the second side along the front-back direction than the edge member and has a restricting surface that faces the edge member with a gap between the restricting portion and the edge member; and, wherein a difference between an inclination angle $\alpha$ in a cross section of the diaphragm and the tapered portion of the edge member and an inclination angle $\beta$ of the restricting surface of the edge support member is ±5 degrees or less.

2. The speaker according to claim 1, wherein a vent extending from the first side to the second side is formed in the restricting portion.

3. The speaker according to claim 2, wherein a groove open toward a center of the frame is formed in the restricting portion as the vent, and a plurality of grooves are circumferentially formed at intervals.

4. The speaker according to claim 1, wherein an opposing wall facing an outer circumferential end face of the edge support member is provided as part of the frame.

5. An acoustic device comprising the speaker of claim 1, wherein:

the frame is fixed in a case; and, an interior of the case is divided into an external ventilation space, which is located along the front-back direction more on the first side than the diaphragm, and a closed space, which is located along the front-back direction more on the second side than the diaphragm.

6. The speaker according to claim 1, wherein the difference between the inclination angle $\alpha$ in the cross section of the diaphragm and the tapered portion of the edge member and the inclination angle $\beta$ of the restricting surface of the edge support member is ±3 degrees or less.

7. The speaker according to claim 1, wherein the restricting portion has a comb shape having many vents.

8. The speaker according to claim 7, wherein each vent is a groove.

9. The speaker according to claim 8, wherein the grooves are circumferentially arranged at a constant pitch.

10. The speaker according to claim 8, wherein a main portion of the speaker has a true circular shape centered around a center line, and wherein an open end of each vent is open toward the center line.

* * * * *